United States Patent
Dwivedi et al.

(10) Patent No.: US 11,328,433 B2
(45) Date of Patent: May 10, 2022

(54) COMPOSITE FIELD BASED SINGLE SHOT PREDICTION

(71) Applicant: Honda Motor Co., Ltd., Tokyo (JP)

(72) Inventors: Isht Dwivedi, Santa Clara, CA (US); Chiho Choi, San Jose, CA (US); Srikanth Malla, Sunnyvale, CA (US); Behzad Dariush, San Ramon, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 20 days.

(21) Appl. No.: 16/917,864

(22) Filed: Jun. 30, 2020

(65) Prior Publication Data
US 2021/0264617 A1 Aug. 26, 2021

Related U.S. Application Data

(60) Provisional application No. 62/981,143, filed on Feb. 25, 2020.

(51) Int. Cl.
*G06T 7/246* (2017.01)
*G05D 1/02* (2020.01)

(52) U.S. Cl.
CPC ........... *G06T 7/246* (2017.01); *G05D 1/0246* (2013.01); *G06T 2207/30241* (2013.01)

(58) Field of Classification Search
CPC .......... G06T 7/20; G06T 7/215; G06T 7/246; G06T 7/248; G06T 7/251;
(Continued)

(56) References Cited

U.S. PATENT DOCUMENTS

2019/0152490 A1* 5/2019 Lan et al. ......... B60W 30/0956
2019/0367019 A1* 12/2019 Yan et al. .............. G05D 1/027

FOREIGN PATENT DOCUMENTS

JP 2018055141 A 4/2018

OTHER PUBLICATIONS

A. Alahi, K. Goel, V. Ramanathan, A. Robicquet, L. Fei-Fei, and S. Savarese, "Social lstm: Human trajectory prediction in crowded spaces," in Proceedings of the IEEE conference on computer vision and pattern recognition, pp. 961-971, 2016.
(Continued)

*Primary Examiner* — Andrew W Johns
(74) *Attorney, Agent, or Firm* — Rankin, Hill & Clark LLP (57) ABSTRACT

According to one aspect, composite field based single shot trajectory prediction may include receiving an image of an environment including a number of agents, extracting a set of features from the image, receiving the image of the environment, encoding a set of trajectories from the image, concatenating the set of features and the set of trajectories from the image to generate an interaction module input, receiving the interaction module input, encoding a set of interactions between the number of agents and between the number of agents and the environment, concatenating the set of interactions and a localization composite field map to generate a decoder input, receiving the decoder input, generating the localization composite field map and an association composite field map, and generating a set of trajectory predictions for the number of agents based on the localization composite field map and the association composite field map.

20 Claims, 6 Drawing Sheets

(58) Field of Classification Search
CPC ........... G06T 2207/20084; G06T 2207/30241; G06K 9/00335; G06K 9/00624; G06K 9/00664; G06K 9/00771; G06K 9/00778; G06K 9/00791; G06N 3/02; G06N 3/049
See application file for complete search history.

(56) References Cited

OTHER PUBLICATIONS

A. Buades, B. Coll, and J.-M. Morel, "A non-local algorithm for image denoising," in 2005 IEEE Computer Society Conference on Computer Vision and Pattern Recognition (CVPR'05), vol. 2, pp. 60-65, IEEE, 2005.
C. Choi and B. Dariush, "Looking to relations for future trajectory forecast," in Proceedings of the IEEE International Conference on Computer Vision, pp. 921-930, 2019.
C. Choi, "Shared cross-modal trajectory prediction for autonomous driving," arXiv preprint arXiv:2004.00202, 2020.
H. Cui, V. Radosavljevic, F.-C. Chou, T.-H. Lin, T. Nguyen, T.-K. Huang, J. Schneider, and N. Djuric, "Multimodal trajectory predictions for autonomous driving using deep convolutional networks," in 2019 International Conference on Robotics and Automation (ICRA), pp. 2090-2096, IEEE, 2019.
C. Finn, I. Goodfellow, and S. Levine, "Unsupervised learning for physical interaction through video prediction," in Advances in neural information processing systems, pp. 64-72, 2016.
K. Fukushima and S. Miyake, "Neocognitron: A self-organizing neural network model for a mechanism of visual pattern recognition," in Competition and cooperation in neural nets, pp. 267-285, Springer, 1982.
A. Gupta, J. Johnson, L. Fei-Fei, S. Savarese, and A. Alahi, "Social gan: Socially acceptable trajectories with generative adversarial networks," in Proceedings of the IEEE Conference on Computer Vision and Pattern Recognition, pp. 2255-2264, 2018.
K. He, X. Zhang, S. Ren, and J. Sun, "Delving deep into rectifiers: Surpassing human-level performance on imagenet classification," in Proceedings of the IEEE international conference on computer vision, pp. 1026-1034, 2015.
S. Hochreiter and J. Schmidhuber, "Long short-term memory," Neural computation, vol. 9, No. 8, pp. 1735-1780, 1997.
N. Hussein, E. Gavves, and A. W. Smeulders, "Timeception for complex action recognition," in Proceedings of the IEEE Conference on Computer Vision and Pattern Recognition, pp. 254-263, 2019.
B. Ivanovic and M. Pavone, "The trajectron: Probabilistic multi-agent trajectory modeling with dynamic spatiotemporal graphs," in Proceedings of the IEEE International Conference on Computer Vision, pp. 2375-2384, 2019.
D. Ji, Z. Wei, E. Dunn, and J. M. Frahm, "Dynamic visual sequence prediction with motion flow networks," in 2018 IEEE Winter Conference on Applications of Computer Vision (WACV), pp. 1038-1046, IEEE, 2018.
D. P. Kingma and J. Ba, "Adam: A method for stochastic optimization," arXiv preprint arXiv: 1412.6980, 2014.
S. Kreiss, L. Bertoni, and A. Alahi, "Pifpaf: Composite fields for human pose estimation," in Proceedings of the IEEE Conference on Computer Vision and Pattern Recognition, pp. 11977-11986, 2019.
Y. LeCun, B. Boser, J. S. Denker, D. Henderson, R. E. Howard, W. Hubbard, and L. D. Jackel, "Backpropagation applied to handwritten zip code recognition," Neural computation, vol. 1, No. 4, pp. 541-551, 1989.
N. Lee, W. Choi, P. Vemaza, C. B. Choy, P. H. Torr, and M. Chandraker, "Desire: Distant future prediction in dynamic scenes with interacting agents," in Proceedings of the IEEE Conference on Computer Vision and Pattern Recognition, pp. 336-345, 2017.

A. Lerner, Y. Chrysanthou, and D. Lischinski, "Crowds by example," in Computer graphics forum, vol. 26, pp. 655-664, Wiley Online Library, 2007.
S. Malla, I. Dwivedi, B. Dariush, and C. Choi, "Nemo: Future object localization using noisy ego priors," 2019.
S. Malla, B. Dariush, and C. Choi, "Titan: Future forecast using action priors," arXiv preprint arXiv:2003.13886, 2020.
N. Nikhil and B. Tran Morris, "Convolutional neural network for trajectory prediction," in Proceedings of the European Conference on Computer Vision (ECCV), pp. 0-0, 2018.
S. Pellegrini, A. Ess, K. Schindler, and L. Van Gool, "You'll never walk alone: Modeling social behavior for multi-target tracking," in 2009 IEEE 12th International Conference on Computer Vision, pp. 261-268, IEEE, 2009.
A. Robicquet, A. Sadeghian, A. Alahi, and S. Savarese, "Learning social etiquette: Human trajectory understanding in crowded scenes," in European conference on computer vision, pp. 549-565, Springer, 2016.
D. E. Rumelhart, G. E. Hinton, and R. J. Williams, "Learning representations by back-propagating errors," nature, vol. 323, No. 6088, pp. 533-536, 1986.
A. Sadeghian, V. Kosaraju, A. Sadeghian, N. Hirose, H. Rezatofighi, and S. Savarese, "Sophie: An attentive gan for predicting paths compliant to social and physical constraints," in Proceedings of the IEEE Conference on Computer Vision and Pattern Recognition, pp. 1349-1358, 2019.
A. Sadeghian, F. Legros, M. Voisin, R. Vesel, A. Alahi, and S. Savarese, "Car-net: Clairvoyant attentive recurrent network," in Proceedings of the European Conference on Computer Vision (ECCV), pp. 151-167, 2018.
S. Su, C. Peng, J. Shi, and C. Choi, "Potential field: Interpretable and unified representation for trajectory prediction," arXiv preprint arXiv:1911.07414, 2019.
Vemula, A., Muelling, K., Oh, J.: Social attention: Modeling attention in human crowds. In: 2018 IEEE international Conference on Robotics and Automation (ICRA). pp. 1-7. IEEE (2018).
X. Wang, R. Girshick, A. Gupta, and K. He, "Non-local neural networks," in Proceedings of the IEEE conference on computer vision and pattern recognition, pp. 7794-7803, 2018.
S. Xingjian, Z. Chen, H. Wang, D.-Y. Yeung, W.-K. Wong, and W.-c. Woo, "Convolutional lstm network: A machine learning approach for precipitation nowcasting," in Advances in neural information processing systems, pp. 802-810, 2015.
H. Xue, D. Q. Huynh, and M. Reynolds, "Ss-lstm: A hierarchical lstm model for pedestrian trajectory prediction," in 2018 IEEE Winter Conference on Applications of Computer Vision (WACV), pp. 1186-1194, IEEE, 2018.
T. Yagi, K. Mangalam, R. Yonetani, and Y. Sato, "Future person localization in first-person videos," in Proceedings of the IEEE Conference on Computer Vision and Pattern Recognition, pp. 7593-7602, 2018.
Y. Yao, M. Xu, C. Choi, D. J. Crandall, E. M. Atkins, and B. Dariush, "Egocentric vision-based future vehicle localization for intelligent driving assistance systems," in 2019 International Conference on Robotics and Automation (ICRA), pp. 9711-9717, IEEE, 2019.
P. Zhang, W. Ouyang, P. Zhang, J. Xue, and N. Zheng, "Sr-lstm: State refinement for lstm towards pedestrian trajectory prediction," in Proceedings of the IEEE Conference on Computer Vision and Pattern Recognition, pp. 12085-12094, 2019.
Isht Dwivedi, SSP: Single Shot Future Trajectory Prediction, 2020 IEEE/RSJ International Conference on Intelligent Robots and Systems (IROS). IEEE, Oct. 25, 2020. p. 2211-2218.
Hirakawa Tsubasa, The course prediction based on the depths study using wings and video, the image lab Jul. 2019, the 30th volume No. 7, Japan, Japan Industrial Publishing Co., Ltd., Jul. 10, 2019, p. 1-7.
Japanese Office Action of JP Serial No. 2021-018552 dated Jan. 6, 2022, 2 pages.

\* cited by examiner

COMPOSITE FIELD BASED SINGLE SHOT PREDICTION

CROSS-REFERENCE TO RELATED APPLICATIONS

This application claims the benefit of U.S. Provisional Patent Application, Ser. No. 62/981,143 entitled "SYSTEM FOR SINGLE SHOT PREDICTION USING COMPOSITE FIELDS AND METHOD THEREOF", filed on Feb. 25, 2020; the entirety of the above-noted application(s) is incorporated by reference herein.

BACKGROUND

Future trajectory prediction may be used in path planning for all types of scenarios, including humanoid robots, people following robots, and autonomous vehicles. For example, consider a scenario including n number of agents. Recent works have predicted the future trajectory of a single agent during a single forward pass.

For successful deployment on these robots or vehicles, the trajectory prediction should be capable of running in real time using minimal computing resources. These robots may encounter a variety of environments, including environments with a high density of agents. In such cases, trajectory prediction which runs in constant time may be desirable.

BRIEF DESCRIPTION

According to one aspect, a system for composite field based single shot trajectory prediction may include a semantic segmenter, an encoder, a first concatenator, an interaction module, a second concatenator, and a decoder, one or more of which may be implemented via a processor. The semantic segmenter may receive an image of an environment including a number of agents and extract a set of features from the image. The encoder may receive the image of the environment and encode a set of trajectories from the image. The first concatenator may concatenate the set of features and the set of trajectories from the image to generate an interaction module input. The interaction module may receive the interaction module input and encode a set of interactions between the number of agents and between the number of agents and the environment. The second concatenator may concatenate the set of interactions and a localization composite field map to generate a decoder input. The decoder may receive the decoder input and generate the localization composite field map and an association composite field map. The decoder may generate a set of trajectory predictions for the number of agents based on the localization composite field map and the association composite field map.

The decoder may generate the set of trajectory predictions for the number of agents based on a decoding composite field. The encoder may include one or more convolutional layers. The decoder may include one or more convolutional layers, one or more deconvolutional layers, or one or more long short-term memory layers. The localization composite field map may be indicative of positions of agents at a subsequent time step. The association composite field map may be indicative of associations of past locations of agents with current locations of agents. The interaction module may encode the set of interactions between the number of agents and between the number of agents and the environment based on non-local interaction block. The interaction module may be non-convolutional. The number of agents may include pedestrians. The decoder may generate the set of trajectory predictions for the number of agents as a single forward pass.

According to one aspect, a computer-implemented method for composite field based single shot trajectory prediction may include receiving an image of an environment including a number of agents and extracting a set of features from the image, receiving the image of the environment and encoding a set of trajectories from the image, concatenating the set of features and the set of trajectories from the image to generate an interaction module input, receiving the interaction module input and encoding a set of interactions between the number of agents and between the number of agents and the environment, concatenating the set of interactions and a localization composite field map to generate a decoder input, receiving the decoder input and generating the localization composite field map and an association composite field map, and generating a set of trajectory predictions for the number of agents based on the localization composite field map and the association composite field map.

The computer-implemented method for composite field based single shot trajectory prediction may include generating the set of trajectory predictions for the number of agents based on a decoding composite field. Encoding of the set of trajectories from the image may be based on one or more convolutional layers. Encoding of the set of trajectories from the image may be based on one or more stride layers. The localization composite field map and the association composite field map may be generated based on one or more convolutional layers, one or more deconvolutional layers, or one or more long short-term memory layers. The localization composite field map may be indicative of positions of agents at a subsequent time step.

According to one aspect, a system for composite field based single shot trajectory prediction may include a semantic segmenter, an encoder, a first concatenator, an interaction module, a second concatenator, and a decoder, one or more of which may be implemented via a processor. The semantic segmenter may receive an image of an environment including a number of agents and extract a set of features from the image. The encoder may receive the image of the environment and encode a set of trajectories from the image. The first concatenator may concatenate the set of features and the set of trajectories from the image to generate an interaction module input. The interaction module may receive the interaction module input and encode a set of interactions between the number of agents and between the number of agents and the environment based on non-local interaction block. The second concatenator may concatenate the set of interactions and a localization composite field map to generate a decoder input. The decoder may receive the decoder input and generate the localization composite field map and an association composite field map. The decoder may generate a set of trajectory predictions for the number of agents based on the localization composite field map and the association composite field map.

The decoder may generate the set of trajectory predictions for the number of agents based on a decoding composite field. The encoder may include one or more convolutional layers. The decoder may include one or more convolutional layers, one or more deconvolutional layers, or one or more long short-term memory layers.

DETAILED DESCRIPTION

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

A prediction for all agents may be generated based on n forward passes, making the run time O(n). Using a spatio-temporal graph with n nodes, the run times for the n agents may also be O(n). The present disclosure provides systems and techniques for a single shot prediction using composite fields that runs in O(1) time.

According to one aspect, a system for single shot prediction using composite fields that runs in O(1) time is provided. A prediction of trajectories of all agents in a scene in a single shot may be generated. This may be achieved by encoding a position of all pedestrians in an image-like tensor. This tensor may be sent to a fully convolutional encoder-decoder architecture to predict composite maps. These composite maps may be decoded to infer positions of agents over a next or subsequent time step.

Future trajectory forecasting crowds may be achieved using datasets (e.g., ETH datasets from www.eth3d.net, University of Cyprus (UCY) and Stanford Drone Dataset (SDD), etc.). An overall framework using composite fields for single shot prediction of all agents' future locations is provided herein. The framework may predict all agents' future locations in a single-shot using top-view images and may generate a future trajectory forecast based on composite fields. One benefit of using composite fields in a single-shot is a performance increase compared to the current state-of-the-art. A non-local interaction module may improve performance by capturing the interactions in space-time. The framework may run in constant time with respect to a number of agents in the scene. Advantageously, single shot prediction using composite fields may be faster than current state-of-the-art methods (i.e., as their run-time increases with more pedestrians).

The use of composite fields may enable the framework to encode and predict all pedestrians in a crowd using a single tensor, thereby enabling the framework to use a fully convolutional network. This may enable a prediction for the future trajectories of all pedestrians in a single shot (e.g., forward pass). Thus, the run time of the network may be O(1) with respect to the number of agents in the scene.

Composite fields may be interpreted as an ensemble of predictions may be utilized. This ensemble of predictions may produce more accurate trajectory predictions.

An interaction module to capture interactions between pedestrians may be provided. Typically, pooling mechanisms between different LSTM and graph node features may be used to capture interactions. The convolutional nature of this framework may make single shot prediction using composite fields suited to capture interactions between pedestrians.

Figure 1:
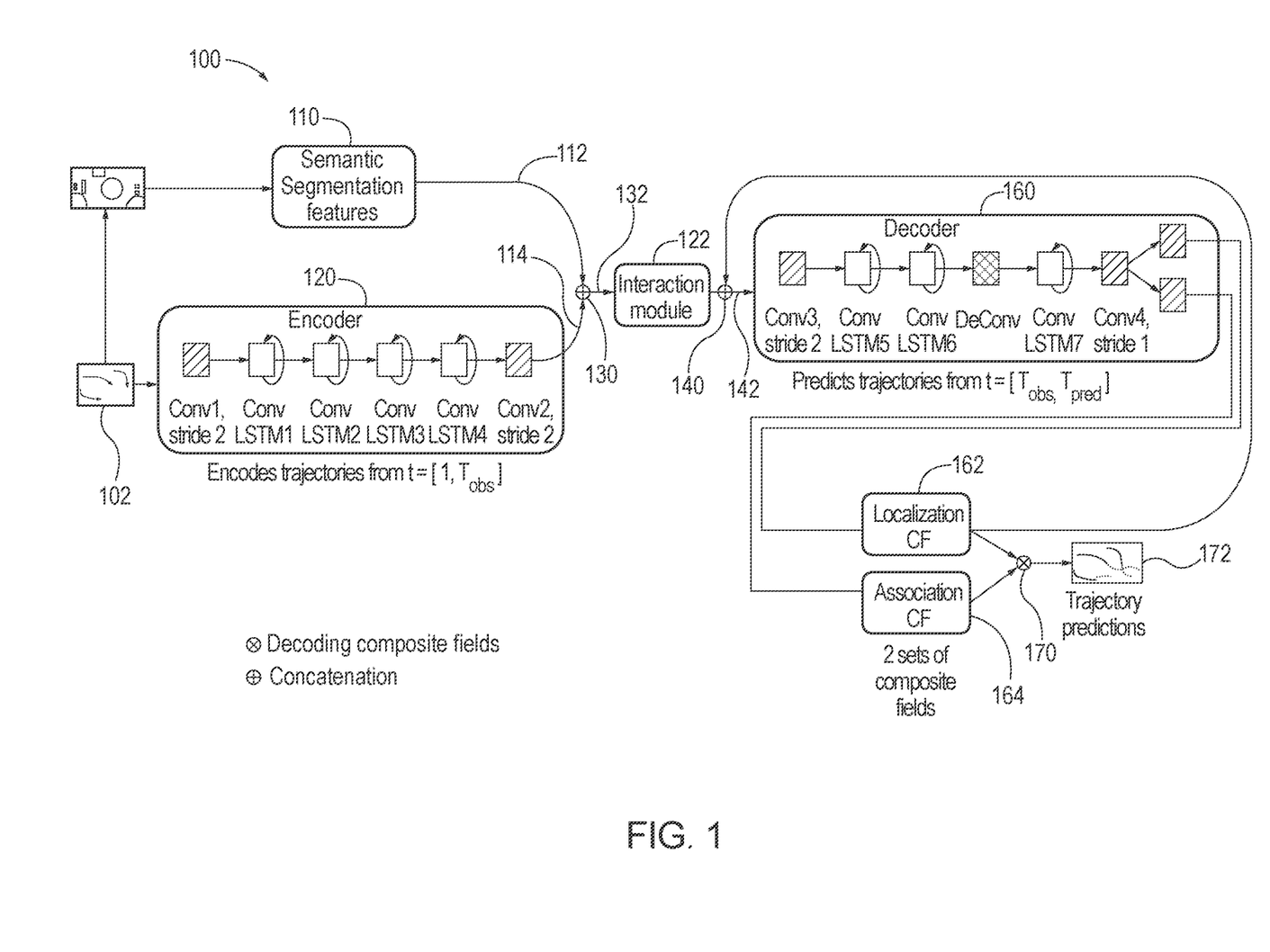
FIG. 1 is an exemplary component diagram of a system for composite field based single shot trajectory prediction, according to one aspect.

FIG. 1 is an exemplary component diagram of a system 100 for composite field based single shot trajectory prediction, according to one aspect. The system 100 for composite field based single shot trajectory prediction may include a semantic segmenter 110, an encoder 120, a first concatenator 130, an interaction module 122, a second concatenator 140, and a decoder 160, one or more of which may be implemented via a processor. In this way, the system 100 for composite field based single shot trajectory prediction may include four or more sub-networks in the semantic segmenter 110, the encoder 120, the interaction module 122, and the decoder 160.

The semantic segmenter 110 may receive an image 102 of an environment including a number of agents and extract a set of features from the image 102. The number of agents may include pedestrians or vehicles. Trajectories of pedestrians (e.g., which are agents) for $T_{obs}$ time steps, i.e., time $t=[1,T_{obs}]$ may be observed. The position of pedestrian or agent i at time t may be denoted by $(x_i^t, y_i^t)$. Trajectories of pedestrians or agents may be predicted for next $T_{pred}$ time steps, i.e., time $t=[T_{obs}+1, T_{obs}+T_{pred}]$.

Generally, agents may be more likely to traverse some areas of the environment than others. For example, pedestrians may be more likely to travel on a sidewalk, as opposed to an area occupied by grass. Agents may also interact with the environment. For example, a pedestrian will change his/her trajectory to avoid collision with a neighboring building. Such contextual information may be included in the network using semantic segmentation features. A pre-trained semantic segmentation model may be implemented by the semantic segmenter 110 to extract features. These features may facilitate encoding two-dimensional physical environment features of the current scenario. The extracted features may be sent to the interaction module 122.

The encoder 120 may receive the image 102 of the environment and encode a set of trajectories 114 from the image 102. The encoder 120 may include one or more convolutional layers and/or ConvLSTM layers. The encoder 120 may encode past trajectory of pedestrians from $t=[1, T_{obs}]$. An output 114 of the encoder 120 or the encoded set of trajectories 114 from the image may be passed to the first concatenator 130.

The first concatenator 130 may concatenate the set of features 112 and the set of trajectories 114 from the image to generate an interaction module input 132. In this way, the output of the encoder 120 may be concatenated with semantic segmentation features which may be provided to the interaction module 122.

The interaction module 122 may receive the interaction module input 132 and encode a set of interactions between the number of agents and between the number of agents and the environment. In this way, the interaction module 122 may capture interactions between pedestrians. The interaction module 122 may encode the set of interactions between the number of agents and between the number of agents and the environment based on non-local interaction block and may be non-convolutional.

According to one aspect, the system may be fully convolutional except for the interaction module 122. Convolutions are a local operation, and therefore, capture interactions occurring in the locality of the convolution operation. To capture agent and environment interactions between farther away areas, non-local interaction blocks may be utilized. Convolutions may be influenced by neighboring values but interacting agents may be outside the field of view. Further, field of view may increase as a network becomes deeper. Similar to the observation in action recognition for temporal image sequences, using the embedded information from past time-steps in the non-local interaction module 122 may improve the overall performance. Concatenation, attention-mechanism (e.g., spatio-temporal) and pyramid structure with different receptive fields may be implemented within the interaction module 122.

The second concatenator 140 may concatenate the set of interactions and a localization composite field map 162 to generate a decoder input 142. The decoder 160 may receive the decoder 160 input and generate the localization composite field map 162 and an association composite field map 164. According to one aspect, the localization composite field map 162 and the association composite field map 164 may be interpreted as an ensemble of predictions. The ensemble of predictions produces more accurate trajectory predictions.

The decoder 160 may generate a set of trajectory predictions for the number of agents based on the localization composite field map 162 and the association composite field map 164. In other words, an output of the decoder 160 may be a set of composite fields 162, 164, which may be processed to infer positions of pedestrians or agents at a next time step. The localization composite field map 162 may be indicative of or utilized to determine positions of agents at a subsequent time step.

The association composite field map 164 may be indicative of associations of past locations of agents with current locations of agents. Stated another way, association fields 164 may be utilized to associate newly found or determined pedestrian locations with past locations for that same pedestrian or agent. Fields generated by the architecture according to system of FIG. 1 may have dimensions.

The decoder 160 may generate the set of trajectory predictions for the number of agents based on a decoding composite field 170. The decoder 160 may include one or more convolutional layers, one or more deconvolutional layers, or one or more long short-term memory layers, and/or ConvLSTM layers. The decoder 160 may generate the set of trajectory predictions for the number of agents as a single forward pass by decoding one or more of the composite maps 162, 164, thereby producing the output trajectories. Stated another way, the localization composite field map and the association composite field map may be decoded by the decoder 160 to determine locations of pedestrians or agents at a next time step.

Localization Fields

For each point $(x,y) \forall x,y \in [1, 64]$, the network predicts parameters $(d_{xy}, d_{xy}, p_{xy})$. If $(x,y)$ is within a threshold distance $d_0$ from a pedestrian location, the parameters $(d_x, d_y, p)$ would represent a prediction of the position of this pedestrian. The vector $(d_{xy}, d_{xy})$ originating at $(x,y)$ may be the prediction corresponding to the point $(x,y)$ with confidence p. If a point on the field $(x,y)$ is not in the vicinity of any pedestrian, then $d_{xy}=0, d_{xy}=0, p_{xy}=0$. Thus, each agent's location may be predicted by multiple points $(x,y)$ in its vicinity. In other words, this may be represented as an ensemble of predictions. These may be weighted together to get the final location of the agent. For weighting the location of pedestrians, an empty 2d array A may be created. For each point $(x,y)$, a Gaussian weighted by p may be added and with $\mu=(x+d_x, y+d_y)$ and a constant covariance $\Sigma$ to this array:

$$A = \Sigma_{x,y} p_{xy} \mathcal{N} (\mu=(x+d_{xy}, y+d_{xy}), \Sigma)$$

The peaks detected on A would be the predicted pedestrian locations.

Association Fields

For each point $(x,y) \forall x,y \in [1, 64]$, the network predicts parameters $(d_{xy1}, d_{xy1}, d_{xy2}, d_{xy2}, p)$. If $(x,y)$ is within a threshold distance from a pedestrian location, $(d_{xy1}, d_{xy1})$ points to the location of this pedestrian at time t−1 and $(d_{xy2}, d_{xy2})$ points to the location of this pedestrian at time t.

Multimodality

The composite fields produced the system may represent an ensemble of predictions for the future location of each pedestrian. To produce a single modal output, predictions may be weighted and the most likely location may be selected from the resulting probability distribution. When considering multi-modal prediction, maximum likelihood estimate is not necessarily selected, rather the prediction from the probability distribution may be sampled. The distribution may be a mixture of Gaussians obtained from the composite field map(s).

Figure 2A:
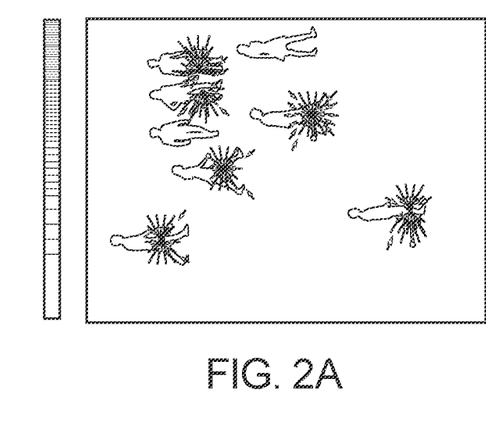
FIG. 2A-2C are exemplary illustrations of composite fields associated with composite field based single shot trajectory prediction, according to one aspect.
Figure 2B:
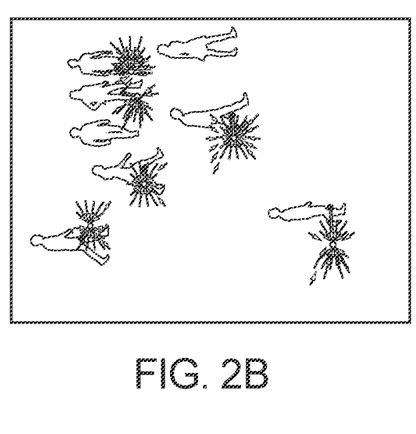
Figure 2C:
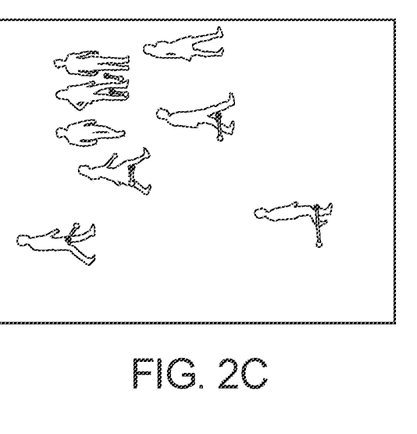

FIG. 2A-2C are exemplary illustrations of composite fields associated with composite field based single shot trajectory prediction, according to one aspect. FIGS. 2A-2B show association fields according to an aspect from univ when it is used as the test set. These fields are used to associate the location of a pedestrian at time t−1 with its location at t. FIG. 2C shows the association between pedestrian locations at t and t−1.

Figure 3A:
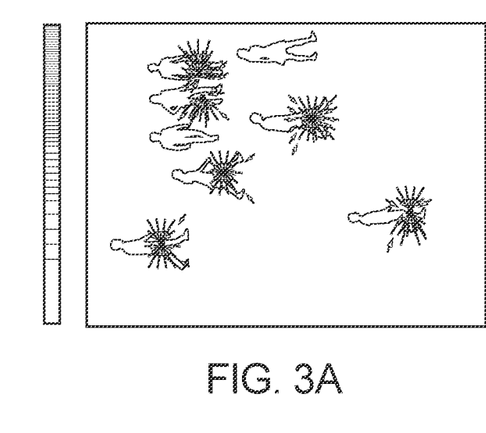
FIG. 3A-3C are exemplary illustrations of composite fields associated with composite field based single shot trajectory prediction, according to one aspect.
Figure 3B:
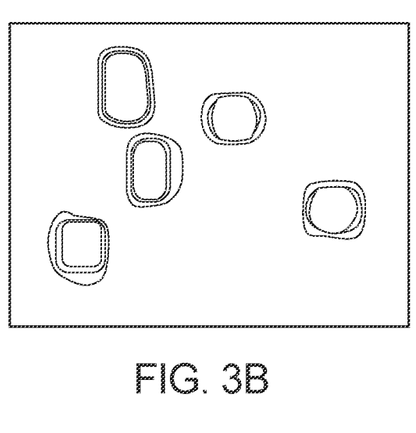
Figure 3C:
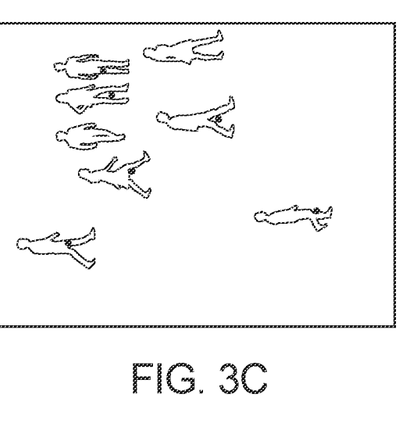

FIG. 3A-3C are exemplary illustrations of composite fields associated with composite field based single shot trajectory prediction, according to one aspect. Localization composite fields shown in FIG. 3A, according to one aspect where univ when it is used as the test set. These fields may be used to predict the locations of all agents at the next time step. Each point represents 3 values (x,y,p). (x,y) may be represented by the vector at each point and p may be represented by the color of the vector. The matrix A which may be formed by weighting the composite fields is shown in FIG. 3B. Peaks detected in A, which are the detected locations of pedestrians are shown in FIG. 3C.

Figure 4:
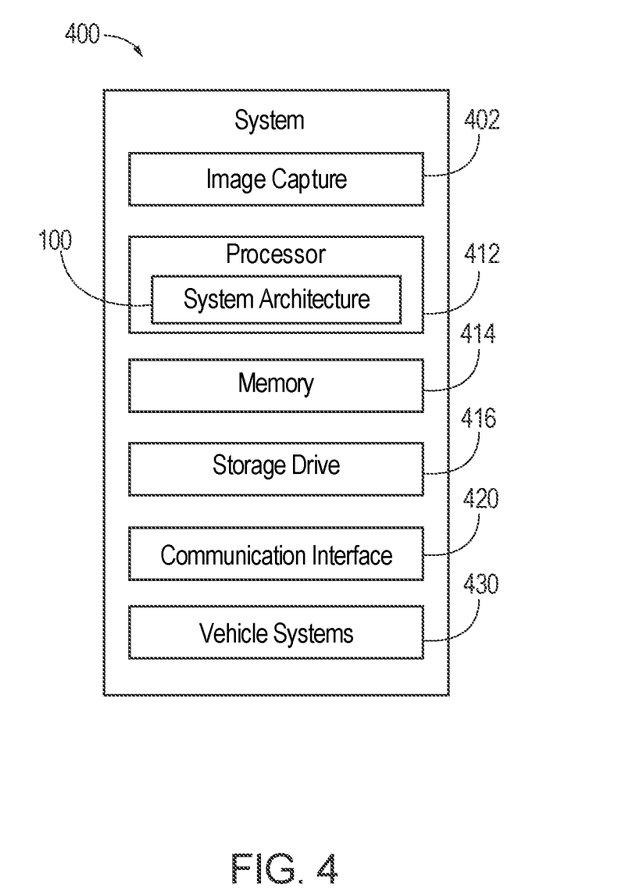
FIG. 4 is an exemplary component diagram of a system for composite field based single shot trajectory prediction, according to one aspect.

FIG. 4 is an exemplary component diagram of a system 400 for composite field based single shot trajectory prediction, according to one aspect. The system 400 may include an image capture device 402, a processor 412, which may be utilized to implement the system 100 of FIG. 1 or one or more of the components of the system 100 of FIG. 1, such as the semantic segmenter, the encoder, the interaction module, and/or the decoder, a memory 414, a storage drive 16, a communication interface 420, and one or more vehicle systems 430. Examples of vehicle systems 430 which may be implemented include sensor systems, drive assist systems, collision mitigation systems. Other exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others. According to one aspect, the processor 412 may control one or more of the vehicle systems 430 based on one or more trajectory predictions.

Figure 5:
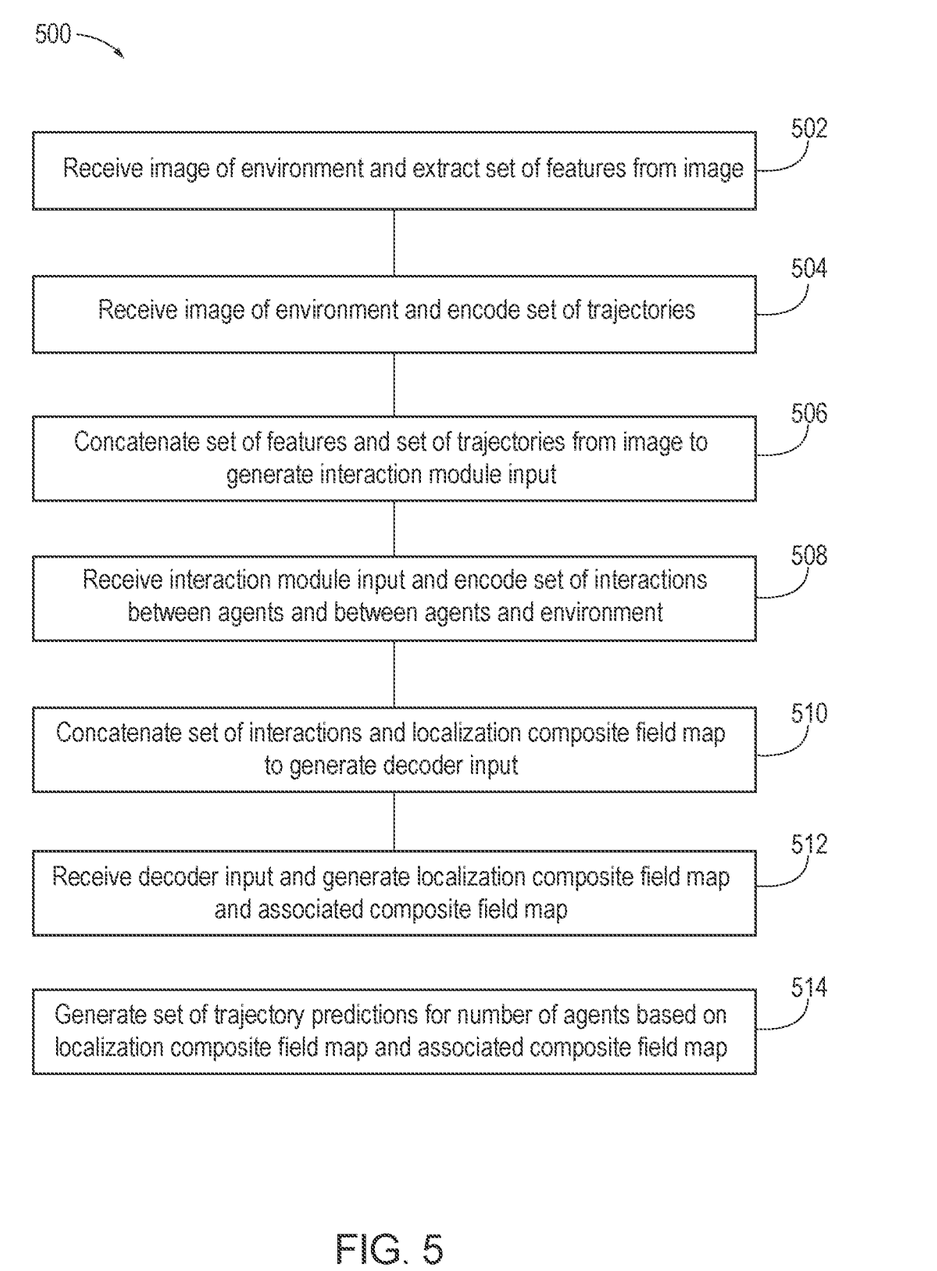
FIG. 5 is an exemplary flow diagram of a method for composite field based single shot trajectory prediction, according to one aspect.

FIG. 5 is an exemplary flow diagram of a computer-implemented method 500 for composite field based single shot trajectory prediction, according to one aspect. For example, the method 500 may be implemented via a processor, a memory, and/or a storage drive. The computer-implemented method 500 for composite field based single shot trajectory prediction may include receiving 502 an image of an environment including a number of agents and extracting a set of features from the image, receiving 504 the image of the environment and encoding a set of trajectories from the image, concatenating 506 the set of features and the set of trajectories from the image to generate an interaction module input, receiving 508 the interaction module input and encoding a set of interactions between the number of agents and between the number of agents and the environment, concatenating 510 the set of interactions and a localization composite field map to generate a decoder input 142, receiving 512 the decoder input 142 and generating the localization composite field map and an association composite field map, and generating 514 a set of trajectory predictions for the number of agents based on the localization composite field map and the association composite field map.

Figure 6:
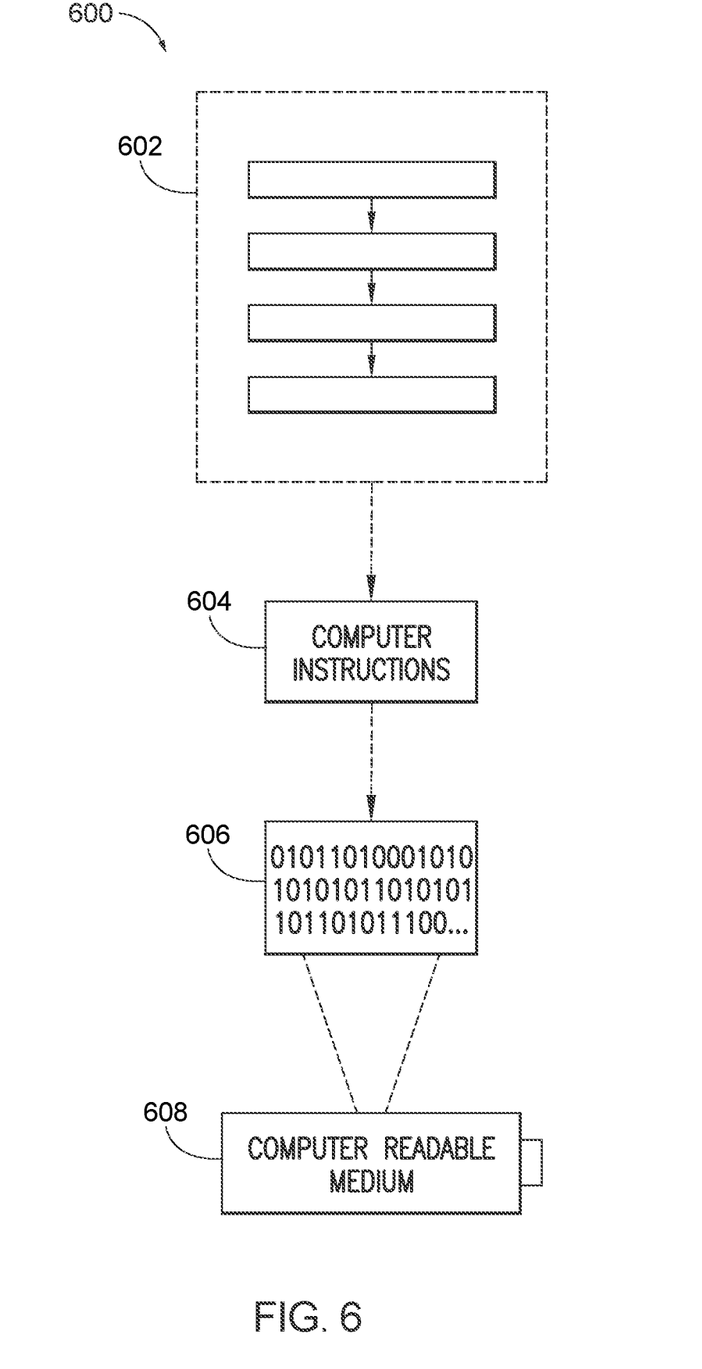
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 500 of FIG. 5. In another aspect, the processor-executable computer instructions 604 may be configured to implement a system, such as the system 100 of FIG. 1 or the system 400 of FIG. 4. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
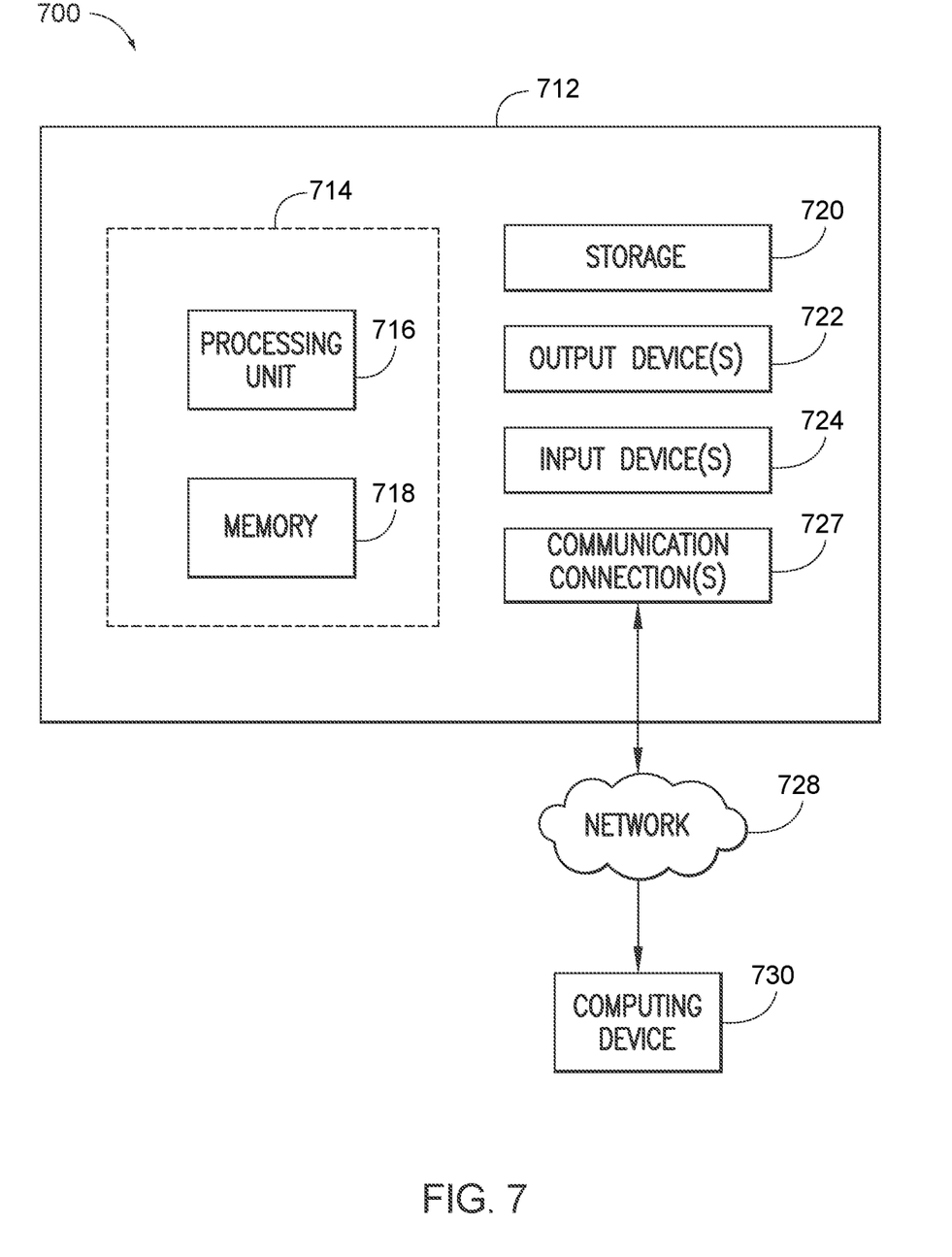
FIG. 7 is an illustration of an example computing environment where one or more of the provisions set forth herein are implemented, according to one aspect.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one aspect provided herein. In one configuration, the computing device 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other aspects, the computing device 712 includes additional features or functionality. For example, the computing device 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 712. Any such computer storage media is part of the computing device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 712 includes input device(s) 724 such as keyboard, mouse, pen, voice input device, touch input device, infrared cameras, video input devices, or any other input device. Output device(s) 722 such as one or more displays, speakers, printers, or any other output device may be included with the computing device 712. Input device(s) 724 and output device(s) 722 may be connected to the computing device 712 via a wired connection, wireless connection, or any combination thereof. In one aspect, an input device or an output device from another computing device may be used as input device(s) 724 or output device(s) 722 for the computing device 712. The computing device 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for composite field based single shot trajectory prediction, comprising:
   a semantic segmenter, implemented via a processor, receiving an image of an environment including a number of agents and extracting a set of features from the image;
   an encoder, implemented via the processor, receiving the image of the environment and encoding a set of trajectories from the image;
   a first concatenator, implemented via the processor, concatenating the set of features and the set of trajectories from the image to generate an interaction module input;
   an interaction module, implemented via the processor, receiving the interaction module input and encoding a set of interactions between the number of agents and between the number of agents and the environment;
   a second concatenator, implemented via the processor, concatenating the set of interactions and a localization composite field map to generate a decoder input; and
   a decoder, implemented via the processor, receiving the decoder input and generating a next iteration of the localization composite field map and an association composite field map,
   wherein the decoder generates a set of trajectory predictions for the number of agents based on the localization composite field map and the association composite field map.

2. The system for composite field based single shot trajectory prediction of claim 1, wherein the decoder generates the set of trajectory predictions for the number of agents based on a decoding composite field.

3. The system for composite field based single shot trajectory prediction of claim 1, wherein the encoder includes one or more convolutional layers.

4. The system for composite field based single shot trajectory prediction of claim 1, wherein the decoder includes one or more convolutional layers, one or more deconvolutional layers, or one or more long short-term memory layers.

5. The system for composite field based single shot trajectory prediction of claim 1, wherein the localization composite field map is indicative of positions of agents at a subsequent time step.

6. The system for composite field based single shot trajectory prediction of claim 1, wherein the association composite field map is indicative of associations of past locations of agents with current locations of agents.

7. The system for composite field based single shot trajectory prediction of claim 1, wherein the localization composite field map or the association composite field map are utilized to generate the set of trajectory predictions for the number of agents based on Gaussian weighted by a confidence.

8. The system for composite field based single shot trajectory prediction of claim 1, wherein the interaction module is non-convolutional.

9. The system for composite field based single shot trajectory prediction of claim 1, wherein the number of agents includes pedestrians.

10. The system for composite field based single shot trajectory prediction of claim 1, wherein the decoder generates the set of trajectory predictions for the number of agents as a single forward pass.

11. A computer-implemented method for composite field based single shot trajectory prediction, comprising:
    receiving an image of an environment including a number of agents and extracting a set of features from the image;
    receiving the image of the environment and encoding a set of trajectories from the image;
    concatenating the set of features and the set of trajectories from the image to generate an interaction module input;
    receiving the interaction module input and encoding a set of interactions between the number of agents and between the number of agents and the environment;
    concatenating the set of interactions and a localization composite field map to generate a decoder input;
    receiving the decoder input and generating a next iteration of the localization composite field map and an association composite field map; and
    generating a set of trajectory predictions for the number of agents based on the localization composite field map and the association composite field map.

12. The computer-implemented method for composite field based single shot trajectory prediction of claim 11, comprising generating the set of trajectory predictions for the number of agents based on a decoding composite field.

13. The computer-implemented method for composite field based single shot trajectory prediction of claim 11, wherein the encoding the set of trajectories from the image is based on one or more convolutional layers.

14. The computer-implemented method for composite field based single shot trajectory prediction of claim 11, wherein the encoding the set of trajectories from the image is based on one or more stride layers.

15. The computer-implemented method for composite field based single shot trajectory prediction of claim 11, wherein the generating the localization composite field map and the association composite field map is based on one or more convolutional layers, one or more deconvolutional layers, or one or more long short-term memory layers.

16. The computer-implemented method for composite field based single shot trajectory prediction of claim 11, wherein the localization composite field map is indicative of positions of agents at a subsequent time step.

17. A system for composite field based single shot trajectory prediction, comprising:
- a semantic segmenter, implemented via a processor, receiving an image of an environment including a number of agents and extracting a set of features from the image;
- an encoder, implemented via the processor, receiving the image of the environment and encoding a set of trajectories from the image;
- a first concatenator, implemented via the processor, concatenating the set of features and the set of trajectories from the image to generate an interaction module input;
- an interaction module, implemented via the processor, receiving the interaction module input and encoding a set of interactions between the number of agents and between the number of agents and the environment based on non-local interaction block;
- a second concatenator, implemented via the processor, concatenating the set of interactions and a localization composite field map to generate a decoder input; and
- a decoder, implemented via the processor, receiving the decoder input and generating a next iteration of the localization composite field map and an association composite field map,
- wherein the decoder generates a set of trajectory predictions for the number of agents based on the localization composite field map and the association composite field map.

18. The system for composite field based single shot trajectory prediction of claim 17, wherein the decoder generates the set of trajectory predictions for the number of agents based on a decoding composite field.

19. The system for composite field based single shot trajectory prediction of claim 17, wherein the encoder includes one or more convolutional layers.

20. The system for composite field based single shot trajectory prediction of claim 17, wherein the decoder includes one or more convolutional layers, one or more deconvolutional layers, or one or more long short-term memory layers.

* * * * *